US012001968B2

(12) United States Patent
Sethi et al.

(10) Patent No.: US 12,001,968 B2
(45) Date of Patent: Jun. 4, 2024

(54) USING PREDICTION UNCERTAINTY QUANTIFIER WITH MACHINE LEARNING CLASSIFIER TO PREDICT THE SURVIVAL OF A STORAGE DEVICE

(71) Applicant: Dell Products, L.P., Round Rock, TX (US)

(72) Inventors: Parminder Singh Sethi, Punjab (IN); Rahul Deo Vishwakarma, Bangalore (IN); Vasanth Sathyanarayanan, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 764 days.

(21) Appl. No.: 17/141,551

(22) Filed: Jan. 5, 2021

(65) Prior Publication Data
US 2022/0215273 A1 Jul. 7, 2022

(51) Int. Cl.
*G06N 5/04* (2023.01)
*G06N 5/01* (2023.01)
*G06N 5/02* (2023.01)
*G06N 20/20* (2019.01)

(52) U.S. Cl.
CPC .............. *G06N 5/04* (2013.01); *G06N 5/01* (2023.01); *G06N 5/027* (2013.01); *G06N 20/20* (2019.01)

(58) Field of Classification Search
None
See application file for complete search history.

(56) References Cited

U.S. PATENT DOCUMENTS

| 9,542,296 B1 * | 1/2017 | Engers ................ G06F 11/008 |
| 10,579,928 B2 * | 3/2020 | Wang ....................... G06N 7/00 |
| 10,613,962 B1 * | 4/2020 | Delange .............. G06F 11/3006 |
| 2021/0042590 A1 * | 2/2021 | Watts ....................... G06N 3/08 |

OTHER PUBLICATIONS

Lin et al., Predicting Remediations for Hardware Failures in Large-Scale Datacenters, 2020 50th Annual IEEE/IFIP International Conference on Dependable Systems and Networks—Supplemental Volume (DSN-S); pp. 13-16 (Year: 2020).*

* cited by examiner

*Primary Examiner* — Alan Chen
(74) *Attorney, Agent, or Firm* — Amin, Turocy & Watson, LLP

(57) ABSTRACT

The described technology is generally directed towards predicting the survival of a storage device (e.g., a hard disk drive or a solid state drive) to a specified time point, expressed as a confidence score, via a prediction uncertainty quantifier framework with a machine learning classifier. The confidence score corresponds to the likelihood of a storage device surviving until a specified time point (e.g., for n hours). In one implementation, a conformal prediction framework provides the confidence score for a storage device, based on survival rate data predicted using recent telemetry data collected for that storage device by an online semi-parametric Mondrian survival forest classifier. Updated confidence scores based on updated telemetry data can be obtained at various evaluation stages to reevaluate whether to take remedial action with respect to a storage device (e.g., replace the storage device). Multiple storage devices can be ranked by their respective associated confidence scores.

20 Claims, 12 Drawing Sheets

USING PREDICTION UNCERTAINTY QUANTIFIER WITH MACHINE LEARNING CLASSIFIER TO PREDICT THE SURVIVAL OF A STORAGE DEVICE

TECHNICAL FIELD

The subject application relates generally to data storage devices, and, for example, to a technology that predicts the survival rate of a storage device, including by using a conformal prediction framework with an online semi-parametric Mondrian survival forest to predict the survival of an unhealthy storage device, and related embodiments.

BACKGROUND

Large data storage systems have large numbers of storage devices comprising hard disk drives (HDDs) and/or solid-state drives (SSDs). Eventually some of those storage devices fail and need to be replaced.

Dell EMC®'s SupportAssist technology uses predictive technology to predict issues in storage devices before they become problematic. Generally, once an issue is predicted or identified for the first time with an SSD/HDD, the storage media becomes unhealthy. If an issue is detected with a storage device, SupportAssist automatically creates a support case with Dell EMC®, which can then provide support to help the customer address the problem. Based on the severity of the issue and the service level purchased by the customer, it can take anywhere from four hours to two days to resolve the issue and take some remedial action, which can include dispatching a replacement part.

However, this approach does not factor in the possibility that the condition of the storage device can get worse or undergo accelerated deterioration before remedial action can be taken. For example, when an issue is predicted for the first time with a storage device, the storage device becomes unhealthy at the time of prediction; however, the storage device generally remains operational. If the issue is not deemed critical at the time of prediction, the issue may not be addressed until (on the order of) two days. In the meantime, because of various reasons such as a fan malfunction causing an increased operating temperature, the condition of the storage device may worsen, and indeed can quickly and completely deteriorate whereby the device stops functioning. This adversely impacts the productivity in the customer environment and thus affects the business, resulting in a bad customer experience.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
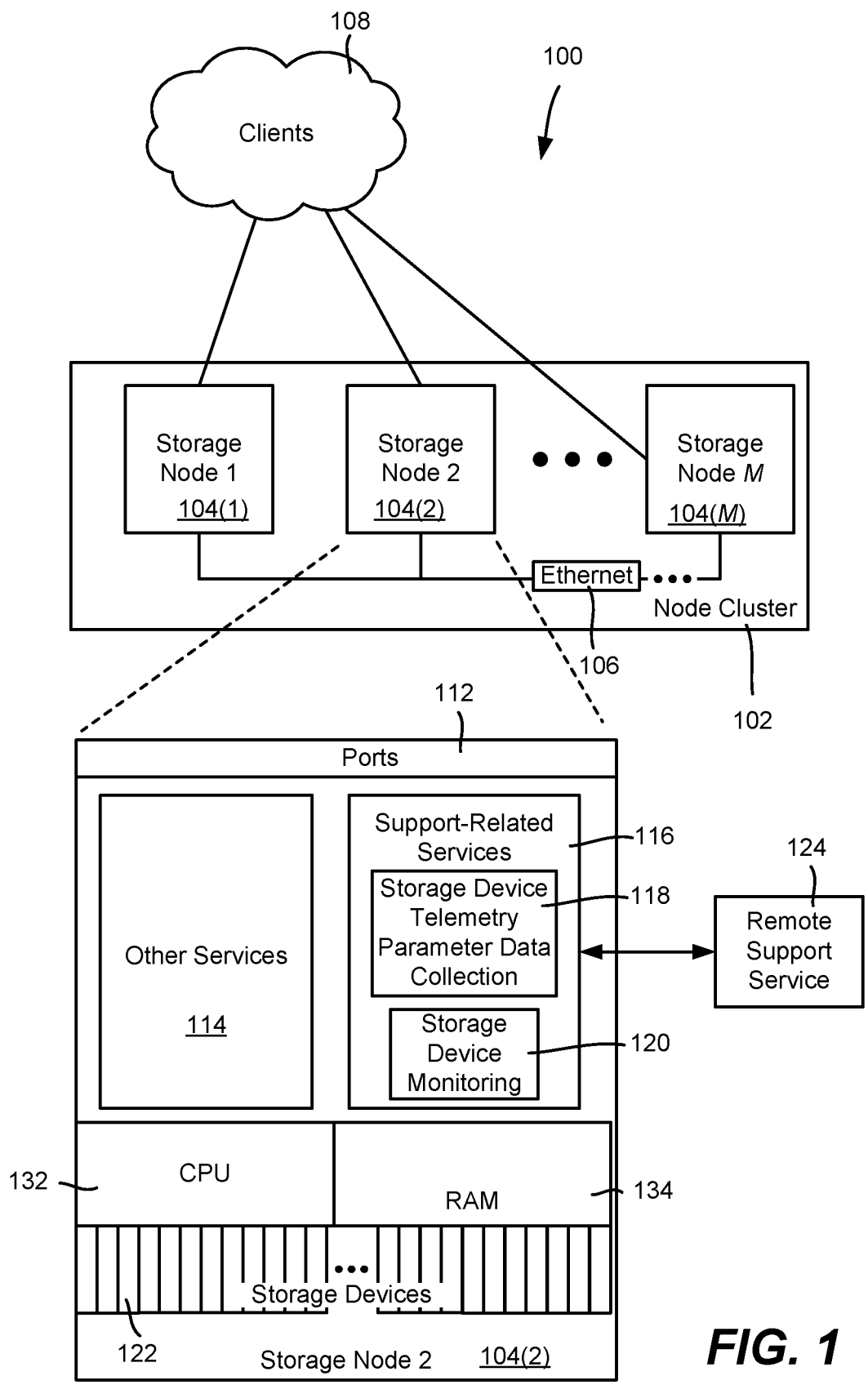
FIG. 1 is an example block diagram representation of part of a data storage system including a number of storage devices of a storage node configured for remote support, in accordance with various aspects and implementations of the subject disclosure.

Various aspects of the technology described herein are generally directed towards predicting the survival rate of an unhealthy storage device in real-time or near real time, based on the current condition of the device as obtained from the device as a dataset of collected telemetry data parameters. To this end, a prediction uncertainty quantifier framework in conjunction with a machine leaning classifier uses the current telemetry data of a storage device to predict its survival rate (which alternatively can be referred to as the device's survival level or endurance level).

In one implementation, the survival rate can be predicted according to a future time, with a confidence score associated with the prediction. For example, the prediction can be to determine a confidence score (e.g., a number between 0 and 1) as to whether the storage device will remain functional for N hours, (with N being a user configurable value). As a more particular example, the prediction uncertainty quantifier framework coupled to a machine learning classifier trained on previous telemetry data collected from a large number of hard disk drives can determine that, based on the most recent telemetry data collected for the device, with a confidence of 0.90154 (approximately 90 percent) the hard drive will survive for 48 hours.

However, instead of relying on such a prediction for that length of time, the technology described herein can be used with more recently collected telemetry data to provide an updated prediction. Thus, the condition of a storage device can be frequently evaluated and reevaluated with respect to a survival rate and the confidence thereof, whereby a support service can take remedial action when deemed needed, (rather than waiting based on a single initial alert corresponding to a one-time health prediction such as critical or non-critical, for example).

The prediction technology can work in conjunction with existing technology that monitors storage devices and sends an initial alert when a storage device is deemed unhealthy. When multiple storage devices are deemed unhealthy, the technology can be coupled to a ranker that ranks storage devices based on their relative confidence scores for a given survival rate timeframe, such that the storage devices most likely to fail in that timeframe can be dealt with first.

It should be understood that any of the examples herein are non-limiting. For instance, some of the examples are based on Dell EMC®'s data storage technology and related support services such as SupportAssist; however virtually any storage system may benefit from the technology described herein. Still further, examples based on a conformal prediction framework coupled to or incorporating an online semi-parametric Mondrian survival forest classifier are described herein; however instead of conformal prediction, any non-conformity measure for survival analysis can be used, such as a Venn predictor (multi-probabilistic approach). Further, the integration of survival analysis with another machine learning classifier (e.g., a k-nearest neighbor classifier) to in general assign a "health score" and/or rank storage devices based thereon can be implemented. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a data storage system 100 comprising a node cluster 102 of storage nodes 104(1)-104(M), in which each node is typically a server generally configured to serve data (e.g., objects or streamed data) in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system, other (e.g., data) services 114 and support-related services 116. As described herein, the support-related services 116 comprise a storage device telemetry parameter dataset collection component 118 or the like that collects parameter data on the node's storage devices, and storage device monitoring 120, such as including a failure prediction model (currently present in SupportAssist) that predicts the failure of a storage device (HDD/SSD) based on Simple Network Management Protocol (SNMP) alerts received from the storage devices 122. The support-related services 116 send the alerts/data to a remote support service 124, such as a Dell EMC® backend service.

In FIG. 1, a CPU 132 and RAM 134 are shown for completeness; note that the RAM 132 may comprise at least some non-volatile RAM. The storage devices 122 generally comprise hard disk drives and/or solid-state drives, but can include any other suitable type of storage resource. As can be readily appreciated, components of the data storage system including those described herein can be at various times in any storage device or devices, such as in the RAM 134, in the storage devices s 122, or in a combination of both, for example.

Figure 2:
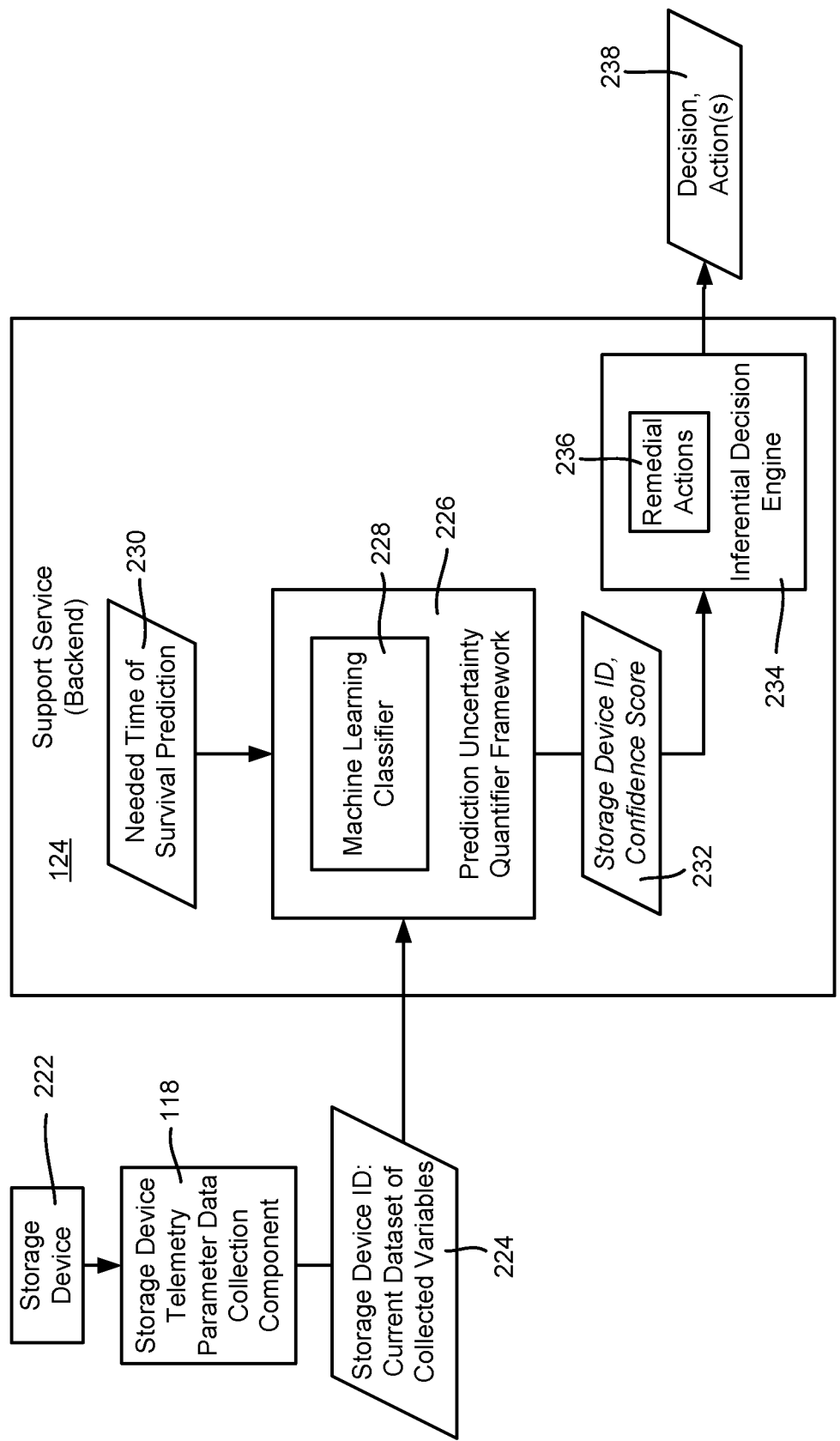
FIG. 2 is an example block diagram showing how a storage device's telemetry data can be processed by a prediction uncertainty quantifier framework with machine learning classifier to predict confidence of the storage device surviving until a specified future time, in accordance with various aspects and implementations of the subject disclosure.

FIG. 2 shows a general representation of components and data, in which a storage device 222 with a unique identifier (ID) is coupled (e.g., via its controller or the like) to a storage device telemetry parameter data collection component 118. The storage device telemetry parameter data collection component 118 collects a current dataset of collected variables 120 (described below) and sends that information in conjunction with the storage device ID to the support services backend 124.

When the data is received, which can be periodically, on demand or based on some other event, the support service 124 processes the data via the prediction uncertainty quantifier framework 226 with machine learning classifier 228. Based on the needed time of survival prediction 230 (e.g. twenty-four hours), which can be set by a customer and/or be based on a current stage of a number of planned stages (such as an alert stage, an automatic dispatch stage, and so on as described herein), the machine learning classifier output data is processed by the prediction uncertainty quantifier framework 226 into a confidence score 232 corresponding to an uncertainty value. As described herein, the confidence score represents how confident the storage device will survive until the survival prediction time (e.g., twenty-four hours).

In one implementation, the uncertainty score 232 is analyzed by an inferential decision engine 234, which can decide on taking one or more different remedial actions 236 based on the confidence score (corresponding to the likelihood) that the storage device will survive until the predicted time of survival, such as the start of the next stage. An example decision is to take no action (the remedial action is to do nothing) until the next reevaluation at the next stage, such as if the confidence score of surviving until then is high. An example decision and remedial action 238 is to send a notification (e.g., an email or other message) to the customer, notifying them of the storage device's issue/pending failure. Another remedial action, which can be performed in addition to sending a notification, is to order a replacement storage device for delivery according to a regular delivery schedule, while yet another different remedial action is to order a replacement storage device according to an expedited delivery schedule.

It should be noted that in an alternative implementation, the datasets of drives need not be sent to a backend support service. For example, each cluster can have its own classifier and confidence predictor as described herein. However the larger the amount of underlying training data, which can grow over time as described herein, the better the classifier will become at survival prediction, and thus having a single support service that gathers data from multiple customers is likely very beneficial.

Figure 3:
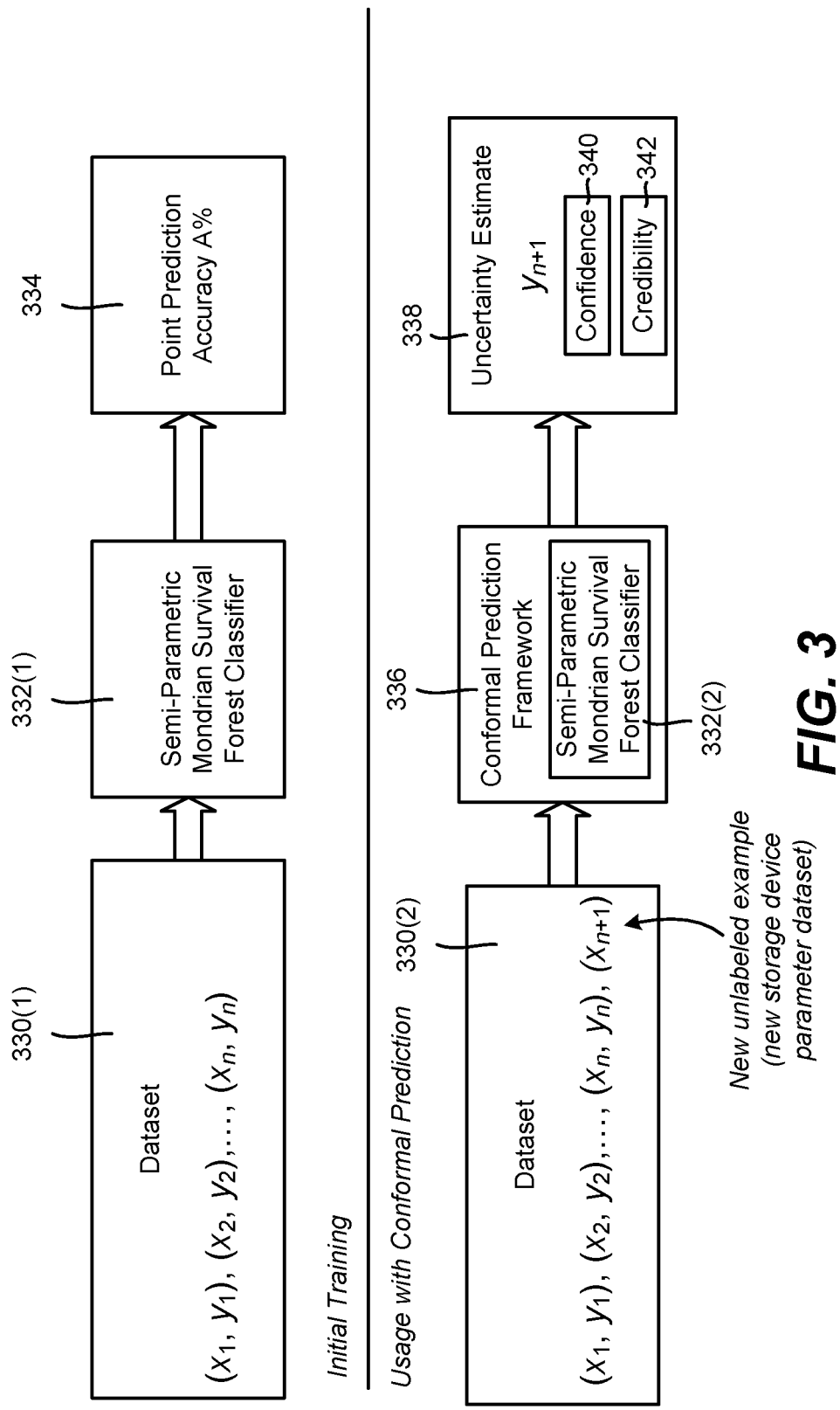
FIG. 3 is an example graphical representation of a cumulative hazard model (the probability of failure of a storage device over time) based on inputting the storage device's telemetry dataset as input features to a semi-parametric Mondrian survival forest classifier, in accordance with various aspects and implementations of the subject disclosure.

In one implementation represented in FIG. 3, the technology described herein implements a semi-parametric Mondrian survival forest as the machine learning classifier. In general, a semi-parametric Mondrian survival forest classifier produces a forest of decision trees from a bootstrap sample while choosing the input features (to split the trees) based on a random subset of the available input features, and determines the prediction data based on data associated with individual trees of the forest. For example, a prediction of a random forest can be obtained by averaging result data in the individual trees in the forest. Notwithstanding, alternative implementations can use other machine learning models/classifiers, including but not limited to, a k-nearest neighbor classifier, a random forest classifier, a support vector machines classifier, a neural networks classifier, a logistic regression classifier, or a boosting classifier.

As can be seen in FIG. 3, a dataset 330(1) of storage device features ($x_1$-$x_n$) with known labels ($y_1$-$y_n$) can be used to train the semi-parametric Mondrian survival forest classifier 332(1) to a certain accuracy level 334. When the dataset 330(1) is updated with a new unlabeled example $x_{n+1}$ (new storage device parameter dataset) to become updated dataset 330(2), and the classifier correspondingly updated to an updated state 332(2), the conformal predication framework 336 is applied on the output data to obtain an uncertainty estimate 338, which can be expressed as a confidence score 340 for the new predicted label $y_{n+1}$.

The output of the conformal prediction framework thus comprises a confidence score 340, which can be interpreted as an indication of the quality of the prediction. A measure of credibility 342 (e.g., Credibility=$p_{max}$, Confidence=1−$p_{max}^{2nd}$, described below) is also obtainable from the conformal prediction framework 336, wherein the credibility measure indicates the quality of the data on which the decision was based. The credibility measure can be used as a filter mechanism to "reject" certain predictions, that is, those deemed not sufficiently credible.

In the semi-parametric Mondrian survival forest implementation, the output data (e.g., a confidence interval for each of its predictions) is processed by the prediction uncertainty quantifier framework 226 (e.g., a conformal prediction framework or a Venn predictor) to obtain a prediction of the reliability of the output. An advantage of this technology is that the confidence with which the label of a new object (the storage device) is predicted is associated to that new object. The confidence is not only based on previously seen examples, but also to that object, and therefore serves as a guideline for reliable prediction. Thus, the classifier also predicts the survival level of a new object (SSD/HDD) based on the attributes of the new object, that is, not only based on the previously attributes, which therefore improves the reliability of the prediction. One implementation of the Mondrian survival forest classifier uses an online setting, which continuously adds new information into the model. In this implementation, the classifier can learn incrementally, scale for large dimensions (a vector comprising many of the available parameter values for a disk), and adapt for concept drift; these aspects facilitate endless learning.

Turning to aspects of the datasets, in one implementation, an HDD or SSD dataset (collected from SupportAssist as part of periodic telemetry over approximately five to six years) is used to train the classifier for their respective types of storage devices. In one example, the SMART (self-monitoring, analysis and reporting technology) variables, SCSI (small computer system interface) variables, and/or serial advanced technology attachment (SATA) variables set forth below are used. Importance methods (XGBoost, LGBM (Light Gradient Boosting Machine), Extra Tree, Decision Tree, Gradient Boost, Ada Boost, and Random Forest) for variable importance were applied on the dataset to derive hyper-variables. The variables that were common in these methods were taken into consideration, and average values are used if missing for a variable.

The following table lists the variables that are collected for HDDs in one example implementation:

| | |
|---|---|
| disk_tempc | disk_read |
| disk_capacity | err_cnt |
| uncorr_rd_err | disk_reallocated |
| uncorr_wrt_err | reco_err_uniq |
| phy_err_other | uncorr_verify_err |
| start_stop_count | recov_err_uniq |
| disk_busy | medium_err |
| log_cnt | corr_wrt_err |
| num_bms | medium_err_uniq |
| corr_rd_err | disk_write |
| corr_verify_err | err_head |
| range_days | disk_capaity |
| power_on_hours | startstop_count |

The following table lists the variables that are collected for SSDs in one example implementation:

| | |
|---|---|
| Power-On Hours Count | CRC Error Count |
| Power Cycle Count | Host Writes |
| Available Reserved Space | Timed Workload - Media Wear |
| Unexpected Power Loss Count | Timed Workload - Host Read/Write |

| | |
|---|---|
| Power Loss Protection Failure | Ratio |
| | Timed Workload Timer |
| Wear Range Delta | Media Wearout Indicator |
| SATA Downshift Count | Total LBAs Written |
| End-to-End Error Detection Count | Total LBAs Read |
| Uncorrectable Error Count | Total NAND Writes |
| Temperature - Device Internal | |

In general, a non-conformity score can be derived for a semi-parametric Mondrian survival forest's output data, which can be used for estimating uncertainties associated with each prediction. These uncertainties can be translated into a confidence interval of each prediction. For a storage device, an incremental learning approach for estimating an SSD/HDD survival level, and a conformal prediction framework are used for reliable prediction for each new dataset prediction.

The survival analysis studies the relationship between input features and the duration of time until an event of interest occurs. In one practical scenario, the technology determines whether a storage drive can survive until a particular specific time point time point, (rather than making predictions for the time points that are provided by the underlying distribution).

The proposed approach thus focuses on a prediction task that considers one specific time point for each test instance, representing the survival or censoring time for that test instance.

With respect to deriving a non-conformity measure used for the prediction score, the following is used:

$$A(H,x,y,t) = 1(y=0)H(x,t) + 1(y=1)(x,t))$$

where H(x,t) is the estimated probability for an event (drive failures) that occurs (y=1), conditioned on x, on or before time t.

Given the above non-conformity measure, together with an underlying model H (the Mondrian survival forest in this example), a calibration set $C = \{(x_1, t_1, y_1), \ldots, (x_n, t_n, y_n)\}$, and a confidence threshold c, the prediction P(x,y) for an input vector x (the collected variables) and time point t (the test instance) is:

$$P(x,y) = \{y : y \in \{0,1\} \& p_{x,y,t} \geq 1-c\}$$

When applying conformal prediction to the task of survival modeling, it is noted that each observation has a timestamp, which is the time at which an event occurred (the storage device failed) or the instance was censored (the storage device survived up to a censoring time limit). The effective handling of high-dimensional data and ease of parallelization is complemented by Mondrian forest.

Figure 4:
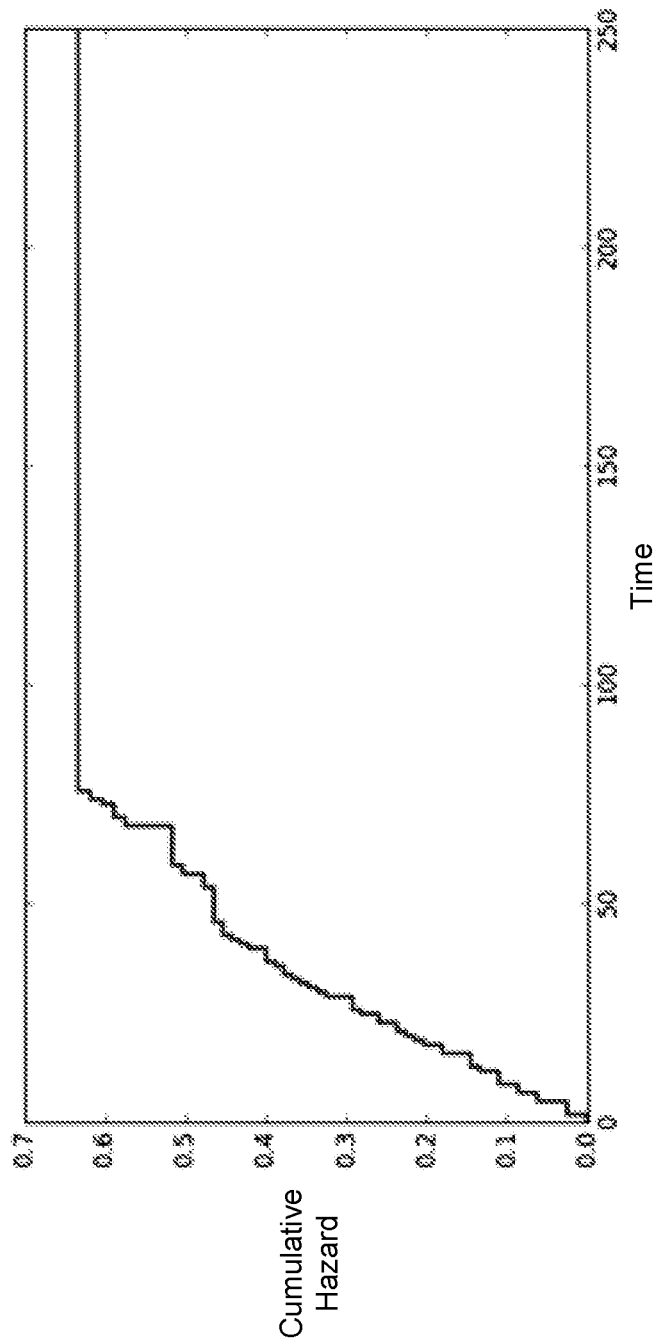
FIG. 4 is an example graphical representation of confidence of survival intervals for predicted survival of a storage device over time, in accordance with various aspects and implementations of the subject disclosure.

FIG. 4 is a graphical representation of a cumulative hazard function/model of the predicted lifetime of one SSD. The results represent the probability of failure at time x given survival until time x.

In the following example, the confidence of survival analysis potential outcomes (interpreted in confidence intervals) is calculated with a (user input) confidence value of 95 percent.

Survival Results

Method

```
learningType = MondrianForest.Survival( )
modeltype = forest
notrees = 100
minleaf = 1
maxdepth = 0
randsub = all
randval = true
splitsample = 0
bagging = true
bagsize = 1.0
modpred = false
laplace = false
confidence = 0.95
conformal = default
```

Figure 5:
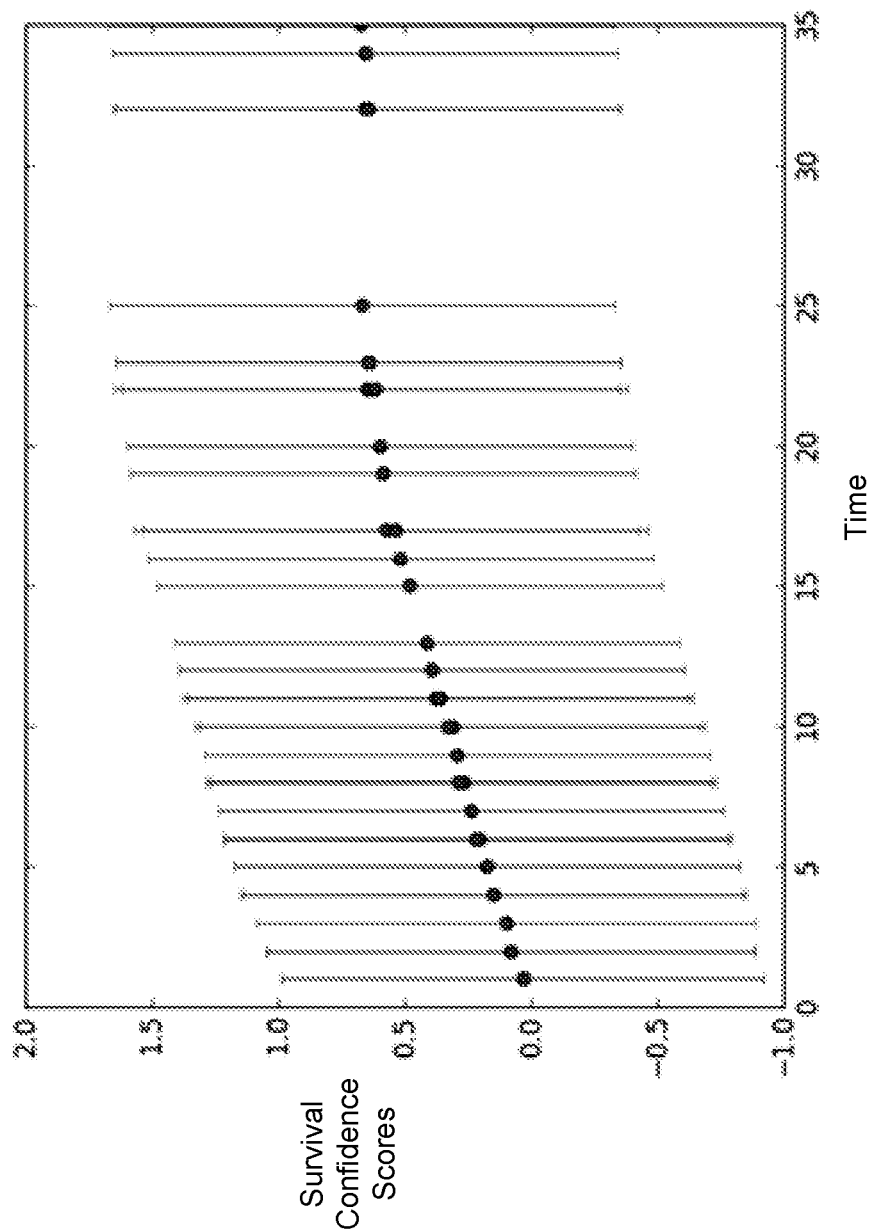
FIG. 5 is an example block diagram representation of classifier training and use of the classifier in a conformal prediction framework to output an uncertainty estimate of a survival prediction of a storage device until a specified future time, in accordance with various aspects and implementations of the subject disclosure.

In FIG. 5, the x-axis represents the time and y-axis represents the confidence of survival. For each data sequence, the vertical bars quantify the upper and lower limits of confidence (confidence interval), and the middle point represents the average confidence.

Turning to aspects of confidence measure and the conformal prediction framework, in general machine learning considers accuracy of the data as a whole, e.g., if a model is A percent accurate on test data, it is assumed to be A percent accurate for production data, and similarly with Area Under Curve values. Conformal prediction is directed to the reliability and creditability of the data, in particular with respect to a new label (a new storage device dataset instance) to be classified.

In general, conformal prediction complements the predictions of machine learning algorithms with reliable measures of confidence. The conformal prediction framework provides error bounds on a per-instance basis and probabilities are well-calibrated, does not need to know prior probabilities (unlike Bayesian learning), can be used with any machine learning algorithm, and can be applied online, offline or semi-offline. More formally, conformal prediction provides multi-valued prediction regions; given a test pattern $X_1$ and significance level E, a conformal predictor provides a prediction region $$\Gamma_i^{\epsilon}$$

that contains $y_i$ with probability $1-\epsilon$.

The following shows example pseudocode for a conformal prediction framework:

| MSE | Corr | AvMSE | VarMSE | DEOMSE | AEEMSE | Valid | Region | Size | Nolrr | Time |
|---|---|---|---|---|---|---|---|---|---|---|
| 0.4446 | NaN | 0.4465 | 0.0019 | 0.0061 | 0.0894 | 0.95 | 1.991 | 100.0 | 100.0 | 0.0536 |

| Conformal Predictors for Classification |
|---|
| Start with: Training set T = $(x_{(1)}, y_{(1)}), \ldots, (x_{(n)}, y_{(n)})$, $x_{(i)}$ in X, number of classes M, $y_{(i)}$ in Y = $y_{(1)}, y_{(2)}, \ldots, y_{(M)}$<br>1: Get new unlabeled example $x_{(n+i)}$.<br>2: for class labels $y_{(j)}$, where j = 1, ..., M do<br>3: Assign label $y_{(j)}$ to $x_{(n+i)}$.<br>4: Update the classifier with: T ∪ $x_{(n+i)}, y_{(j)}$.<br>5: Compute non-conformity measure value, $\alpha_i^{y_j}$ ∀ i = 1, ..., n + 1 to compute the p − value, $P_{(j)}$, with respect to class $y_{(j)}$ (Equation (1) below) using the conformal predictions framework.<br>6: end for<br>7: Output the conformal prediction regions $\Gamma_{1-\varepsilon} = \{y_j : P_j > \varepsilon, y_j \in Y\}$, where $\varepsilon$ is the confidence level. |

$$p(\alpha_{n+1}^{y_p}) = \frac{\text{count}\{i : \alpha_i^{y_p} \geq \alpha_{n+1}^{y_p}\}}{n+1} \quad \text{(Equation (1))}$$

Turning to a real-time/near real-time use-case scenario, consider that the existing failure prediction model in SupportAssist predicts an HDD/SSD failure based on the SNMP alerts received from the HDD/SSD devices. When an alert is received from a drive (HDD or SSD), e.g., on February 2, the support team considers dispatching a new drive if the storage device has failed in the past, or if the past data analysis shows that there is a high probability for the drive to fail after this type of alert. After determining the eligibility of part replacement, based on the alert severity and analyzing the telemetry data collected from the server, the average remaining life of the HDD/SSD can be estimated, e.g., resulting in a decision to dispatch a replacement part on February 7.

However, this prediction may not remain valid for long, as any prediction relies on receiving an SNMP alert, and also because the state of HDD may deteriorate further, such as if other component(s) in the server malfunction. For example, a fan malfunction (e.g., on February 3 at 12:00 am) in one of the server fans occurred, which causes a temperature increase that can make the state of the unhealthy drive worsen, whereby the drive can fail significantly earlier than the initial prediction. In this example, consider that the SSD/HDD stops functioning on February 4, around 3:00 am.

With the existing alerting mechanism, support cannot prevent the drive from failing or inform the customer to secure their data until the customer gets the replacement part. This is because after the initial prediction, support is not aware that the SSD/HDD survival time was reduced because of other factors in the server. Indeed, support may not get any further alert (or may receive the same alert or a low severity alert) because the most critical alert has already been sent. Therefore, the support service never recognizes how quickly the drive's health is becoming worse. As such, the drive may fail earlier than expected, and any action to dispatch the replacement part or inform the customer to take a precautionary measure occurs too late.

Figure 6:
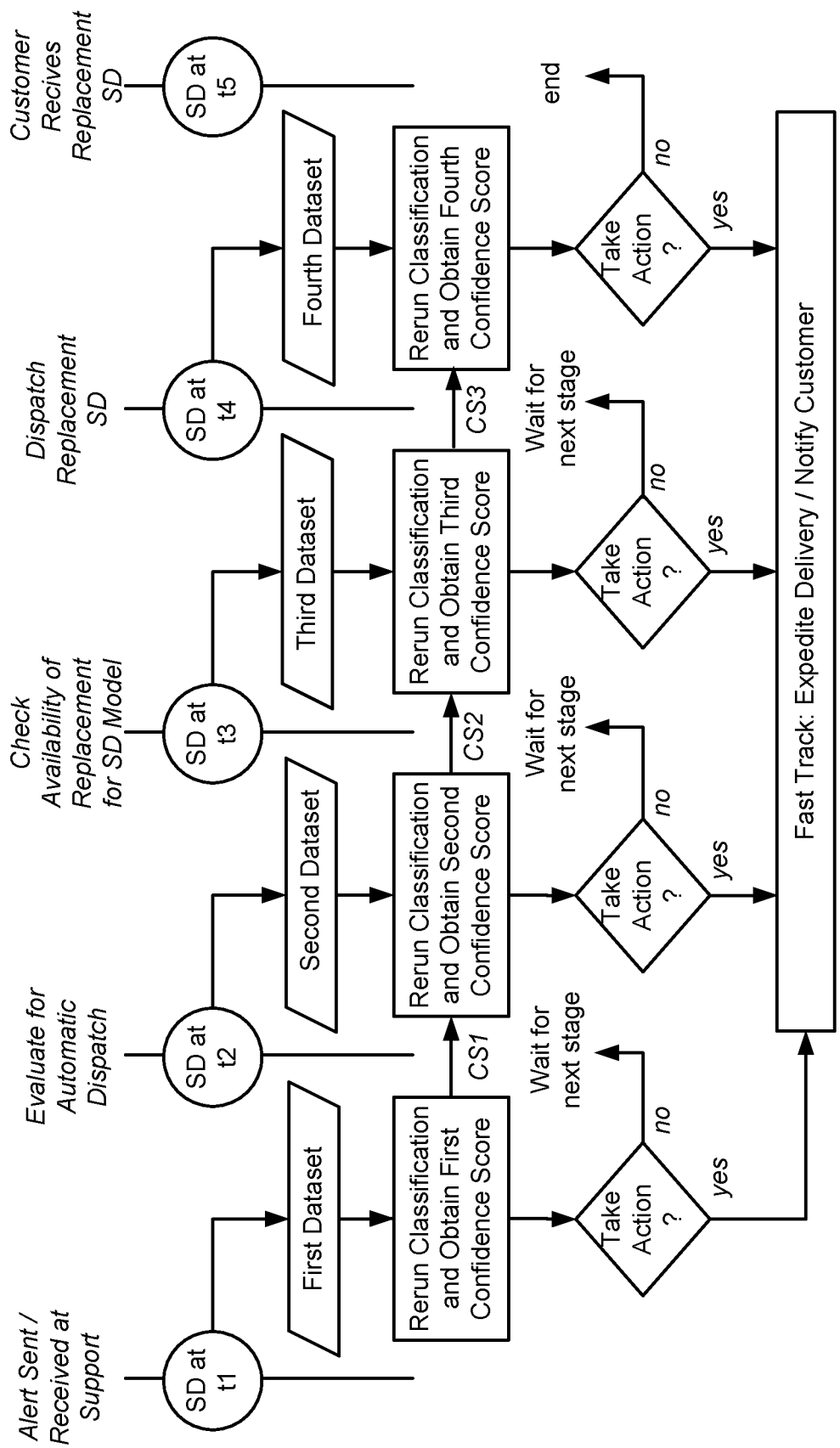
FIG. 6 is an example representation of reevaluating predicted survival of a storage device, via a prediction uncertainty quantifier framework with machine learning classifier, at various evaluation stages related to a replacement part dispatch process, in accordance with various aspects and implementations of the subject disclosure.

To avoid the above (or a similar) scenario, in one aspect, the technology described herein can be triggered after predicting the life of the drive using the existing model. For example, after the initial prediction described above, the conformal prediction framework with online semi-parametric Mondrian survival forest model is applied on the telemetry collection (periodic collected) to predict the survival rate. Once triggered, the technology does not rely on any alert from the drive or any other alert triggered from customer's environment. Instead, at the end of every stage in a replacement part dispatch journey/cycle, the model can be reapplied with updated telemetry data to re-predict the survival of a drive. Once predicted, the prediction data can be passed on to the next stage (as shown in FIG. 6) of the replacement part dispatch journey, which may only span on the order of hours. If the prediction shows that drive health is becoming unexceptionally worse at a subsequent stage, rapid action can be taken, such as to fast track the dispatch process of a replacement drive and/or inform the customer (email/SupportAssist notification/other modes) to take precautionary measures with respect to the drive.

FIG. 6 shows various stages, beginning at an "alert" stage once monitoring detects an issue with a storage device, that is, when an alert is generated and sent to the support service backend. At this time t1, e.g., as soon as the alert for the storage device (SD) was received, the telemetry dataset is processed via the conformal prediction framework with machine learning classifier as described herein to provide a confidence score CS1 as to whether the storage device will survive until the next stage, e.g., w hours or days. If not, remedial action such as to fast track a replacement part or notify the customer to take precautionary measures (e.g., backup the data on that drive) can be performed. This may depend on what the customer has previously instructed the support service to do.

At a second "evaluate eligibility for automatic dispatch "stage at time t2, the support service checks the alert type, and can run multiple algorithms to check the severity of the alerts, to thereby determine whether the drive eligible for automatic dispatch of a replacement part. If eligible for automatic dispatch, at a next "check availability" stage at time t3, support service runs another algorithm to check the availability of the storage device model to be dispatched, finds the nearest distributor in proximity to the customer's location, and determines the date by when the customer needs to receive the part. However, instead of doing nothing between the "evaluate eligibility for automatic dispatch" stage and the "check availability" stage, as described herein an updated telemetry dataset is processed via the conformal prediction framework with machine learning classifier to provide an updated confidence score CS2 as to whether the storage device will survive until the next stage at t3, e.g., x hours or days. Note that the updated confidence score CS2 can be compared against the previous confidence score CS1 (passed to the inferential decision engine evaluator at the next stage) to look for any significant amount of degradation between stages. Again, if the prediction confidence shows that the drive will not last the x hours or days, or if significant degradation is detected, fast track remedial action can be taken.

In a fourth "dispatch replacement" stage at time t4, if a replacement is available at the third stage and the evaluation was not short-circuited by a fast track remedial action (e.g., a replacement part was already expedited), a replacement for the storage device is dispatched through an appropriate courier channel. Again, however, before the fourth stage, a more updated survival prediction (as to whether the device is expected to survive for y hours or days) with associated confidence score CS3 is obtained and evaluated. Again, fast track remedial action can be taken, including to dispatch another replacement part via a faster channel such as overnight.

In between the fourth stage and a fifth stage, with the fifth stage at time t5 corresponding to when the customer will receive the replacement storage device at their preferred location as defined during the purchase of the device, an even more updated survival prediction (as to whether the device is expected to survive for/hours or days) with a new associated confidence score CS4 is obtained and evaluated via the framework described herein based on the storage device's most recent dataset of variables. Again, fast track remedial action can be taken, including to dispatch another replacement part via a faster channel such as overnight without waiting for the customer to receive the replacement storage device over a slower delivery channel.

In sum, after predicting the HDD/SSD failure using the existing model, the conformal prediction framework with online semi-parametric Mondrian survival forest machine learning classifier is applied at each stage in the dispatch journey to predict the drive's survival rate with a confidence value (percentage). To predict the survival rate, that is, whether the HDD/SSD can survive for the next "n" hours or days, the classifier uses the periodically or otherwise collected telemetry data of the HDD/SSD. The next "n" hours or days can be the number of hours or days for a stage before moving to the next stage, as defined by a customer administrator and/or the support service. If the drive can survive more than the time defined in each stage, the prediction data (confidence score) is passed to the next stage. In the next stage, the process is again applied to obtain an updated confidence score using freshly collected (e.g., periodically) telemetry data to predict the survival of HDD/SSD for next n' hours or day (n' can, but need not equal n of the previous stage) defined for that next stage in progress. At any stage, if the algorithm predicts that the HDD cannot survive more than the time defined for a stage, support can take immediate action to fast track the replacement part dispatch process and/or inform the customer (email/notification/other modes) to take precautionary measures.

As can be seen, the health of the device is reevaluated via the machine learning classifier and conformal prediction framework at each stage based on new telemetry data obtained before the evaluation. In this way, the health of an unhealthy storage device is evaluated without needing to wait for another alert from it, using a fresh parameter dataset obtained from and associated with the device. This helps avoid a "failed earlier than initially expected" scenario, because action can be taken based on more frequently evaluating the drive's (much more) recent condition.

It should be noted that the existing model that triggers the alert can be replaced with (or used as a backup to) the machine learning classifier/confidence predictor as described herein. For example, instead of waiting for an alert (which can also act as a backup trigger), a drive's dataset can be evaluated, such as daily, to watch for a low confidence of surviving until a next specified time point. A low (or significantly degraded from the previous) confidence score can be used to deem the drive unhealthy or suspected as becoming unhealthy before an actual alert occurs.

Figure 7:
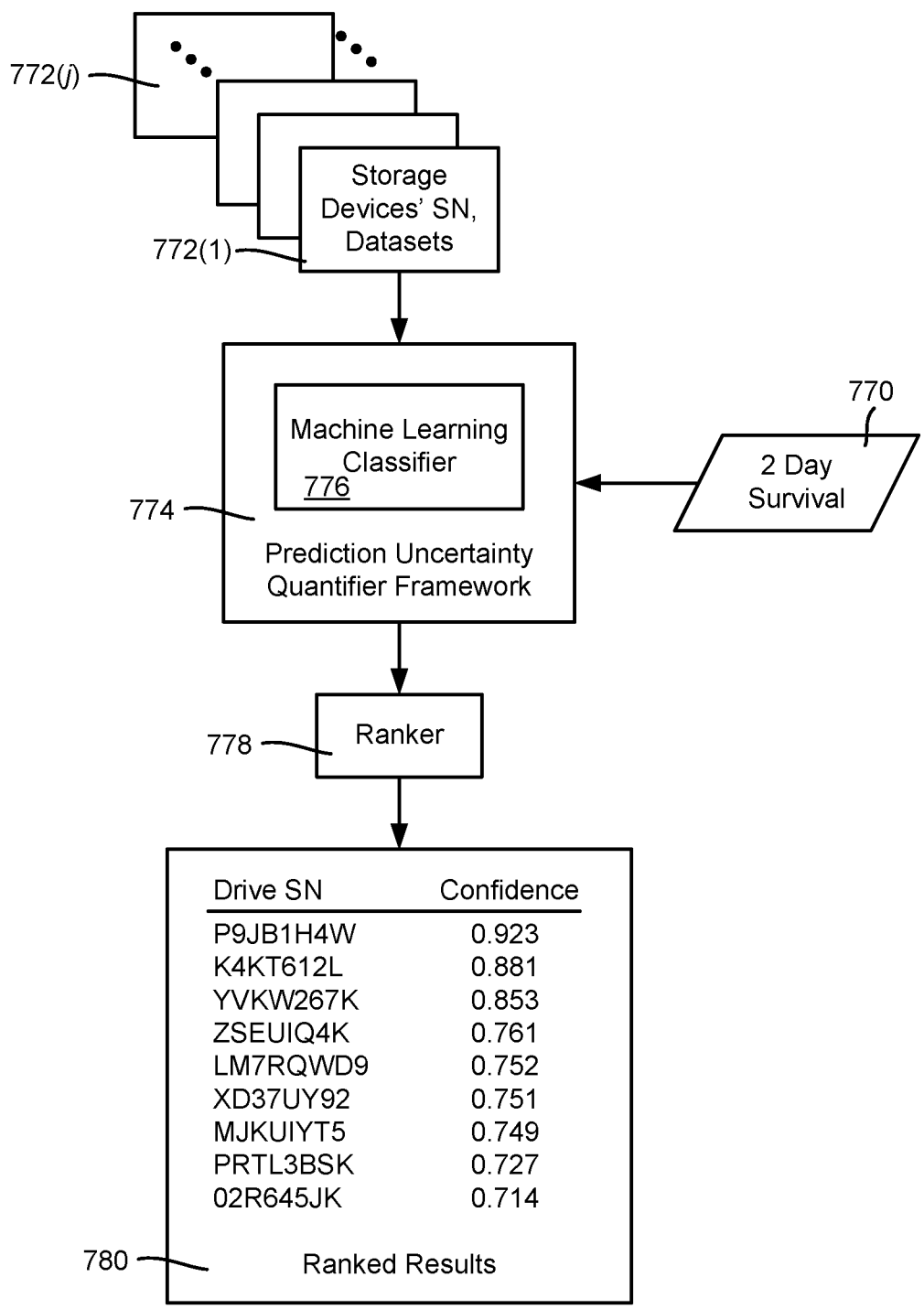
FIG. 7 is an example block diagram showing how survival confidence scores can be used to rank storage devices relative to one another, in accordance with various aspects and implementations of the subject disclosure.

FIG. 7 shows another aspect, namely that multiple drives can be ranked relative to each other with respect to their confidence level of surviving to a future specified time point 770, e.g., forty-eight hours. The storage devices' respective datasets 772(1)-772(j) are input into a prediction uncertainty quantifier framework 774 with machine learning classifier 776 as described herein to obtain a confidence score associated with each drive ID. A ranker 778 sorts the results by confidence score into ranked results 780, which can be from highest to lowest as shown, or vice-versa (those most likely to fail are ranked first).

In the example of FIG. 7, the ranked results 780 show the output of the prediction model, ranking the drives by confidence factor with a survival rate for the next two days. The drive IDs are listed in decreasing order of their survival rate for the next "n" hours/days, where n is 48 hours in this example. For example, the ranked results 780 show that the drive with serial number P9JB1H4 W has a probability of 92.3% to survive for the next two days (with the number of hours or days as defined by the user). Note that the prediction model can be, but need not be applied only for unhealthy drives. This information can be presented to the support team, such as for working with the administrator in the customer data center. It is also feasible to merge/sort results of SSDs and HDDs, or provide separate ranked result sets.

In this way, a technician or automated analysis tool can preemptively warn of potentially upcoming problems with one or more drives by each drive's ID. Even before an actual alert occurs, a customer may want to replace or have replacement types of drives ready to replace those drives deemed most likely to fail.

Further, it is likely that in a large datacenter, many drives may cause alerts to be generated in roughly the same time period. Having a ranked list of which ones are the worst, possibly even before any are actually deemed unhealthy following an alert, can allow a customer to plan for or make replacements of the worst ones first, and regularly monitor the others over time.

Figure 8:
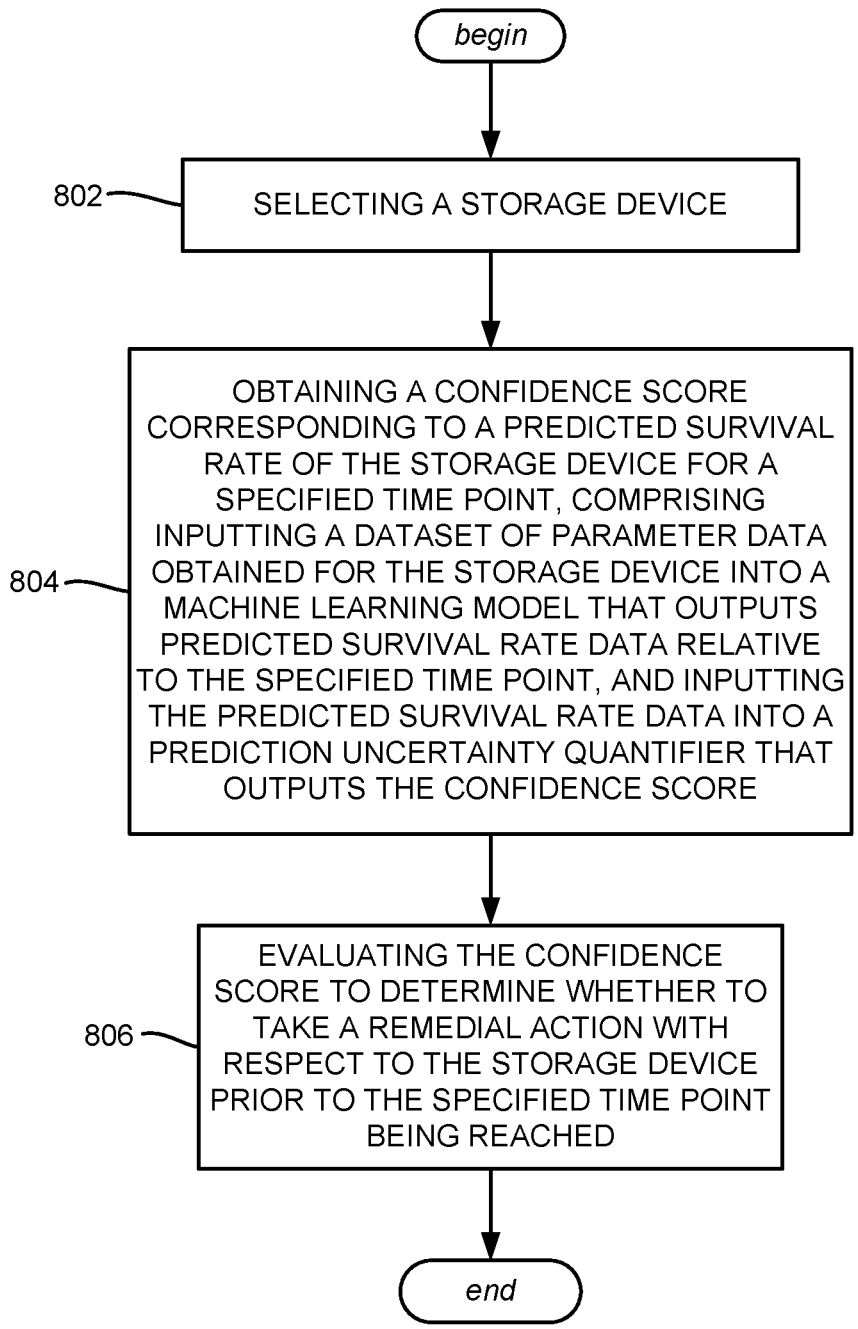
FIG. 8 is an example flow diagram showing example operations related to obtaining a confidence score for a storage device surviving until a specified time point based on evaluating parameter data of the storage device, in accordance with various aspects and implementations of the subject disclosure.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents selecting a storage device. Operation 804 represents obtaining a confidence score corresponding to a predicted survival rate of the storage device for a specified time point, comprising inputting a dataset of parameter data obtained for the storage device into a machine learning model that outputs predicted survival rate data relative to the specified time point, and inputting the predicted survival rate data into a prediction uncertainty quantifier that outputs the confidence score. Operation 806 represents evaluating the confidence score to determine whether to take a remedial action with respect to the storage device prior to the specified time point being reached.

Further operations can comprise ranking the storage device relative to respective other storage devices based on the confidence score associated with the predicted survival rate of the storage device relative to respective other confidence scores associated with respective other predicted survival rates of the respective other storage devices.

The machine learning model can comprise a semi-parametric Mondrian survival forest model. The storage device can comprise a hard disk drive, and further operations can comprise training the semi-parametric Mondrian survival forest model based on incremental learning using a training dataset obtained from a group of hard disk drives; or the storage device can comprise a solid state drive, and further operations can comprise training the semi-parametric Mondrian survival forest model based on incremental learning using a training dataset obtained from a group of solid state drives.

The prediction uncertainty quantifier can comprise a conformal prediction framework that obtains a non-conformity measure to determine the confidence score and a credibility score. The prediction uncertainty quantifier can comprise a Venn predictor.

The machine learning model can comprise a semi-parametric Mondrian survival forest model, and the prediction uncertainty quantifier can comprise a conformal prediction framework that obtains a non-conformity measure corresponding to the confidence score.

The machine learning model can comprise a k-nearest neighbor classifier, a random forest classifier, a support vector machines classifier, a neural networks classifier, a logistic regression classifier, or a boosting classifier.

Further operations can comprise receiving an alert based on simple network management protocol (SNMP) data received from the storage device, and wherein the selecting the storage device is based on the receiving the alert.

The specified time point can be a first time point associated with a first evaluation stage, the confidence score can be a first confidence score, the predicted survival rate can be a first predicted survival rate, the dataset of parameter data can be a first dataset of parameter data, the predicted survival rate data can be a first predicted survival rate data, the remedial action can be a first remedial action, and further operations can comprise, in response to determining not to take the first remedial action with respect to the storage device, in a second evaluation stage, obtaining a second confidence score corresponding to a second predicted survival rate of the storage device for a second specified time point, which can comprise inputting a second dataset of parameter data obtained for the storage device into the machine learning model that outputs second predicted survival rate data relative to the second specified time point, and inputting the second predicted survival rate data into the prediction uncertainty quantifier that outputs the second confidence score, and evaluating the second confidence score to determine whether to take a second remedial action with respect to the storage device prior to the second specified time point being reached.

Further operations can comprise passing the first confidence score to the second evaluation stage as a prior confidence score; evaluating the second confidence score to determine whether to take the second remedial action can comprise determining whether the second confidence score relative to the prior confidence score indicates storage device degradation to a specified level.

The storage device can be a hard disk drive, and the dataset of parameter data can comprise at least one of self-monitoring, analysis and reporting technology (SMART) variables, small computer system interface (SCSI) variables, or serial advanced technology attachment (SATA) variables collected with respect to the hard disk drive.

The storage device can be a solid state drive, and the dataset of parameter data can comprise at least one of self-monitoring, analysis and reporting technology (SMART) variables, small computer system interface (SCSI) variables, or serial advanced technology attachment (SATA) variables collected with respect to the solid state drive.

Figure 9:
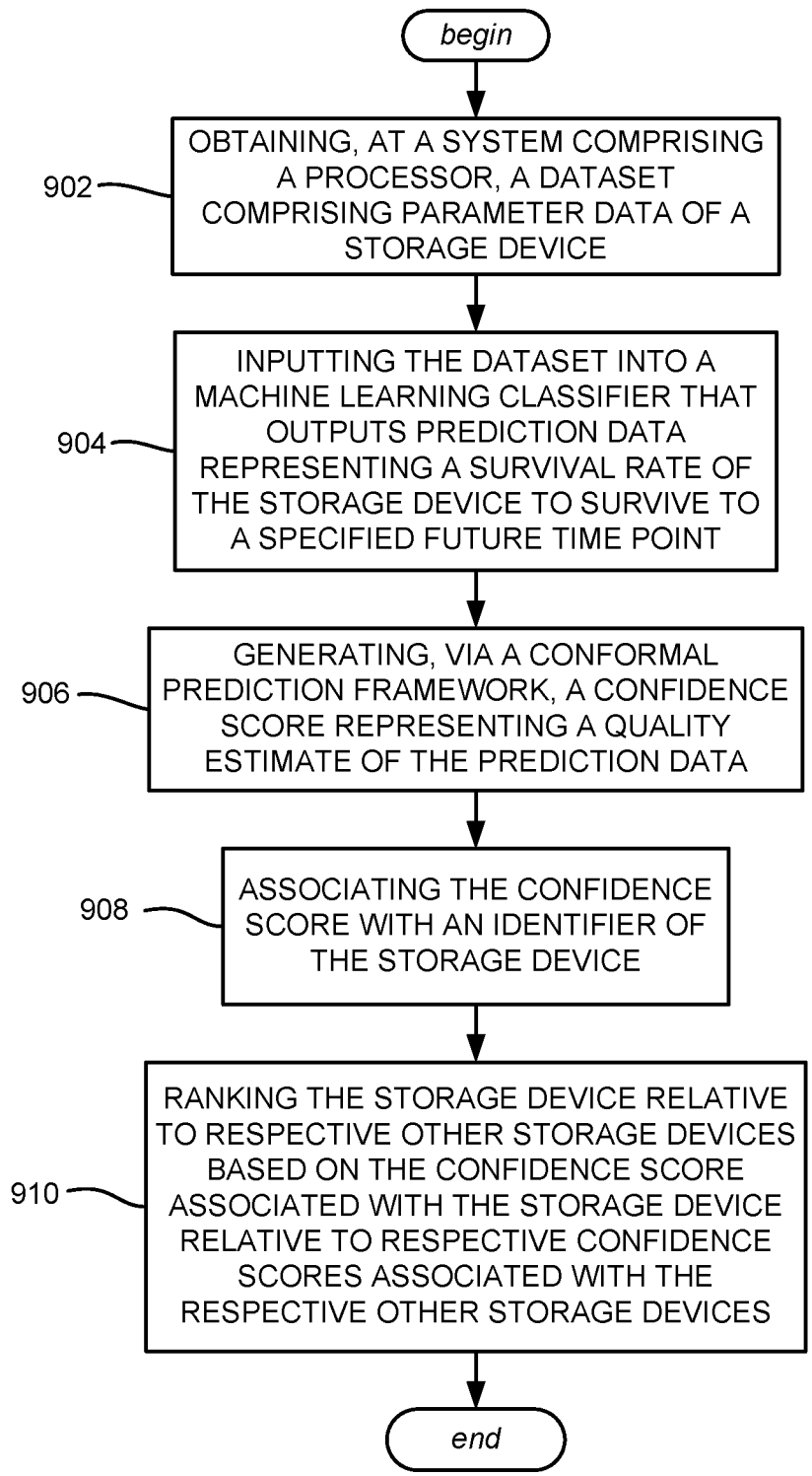
FIG. 9 is an example flow diagram showing example operations related to inputting storage device data into a machine learning classifier that outputs prediction data as to survival of the storage device until a specified future time point, and using the outputted prediction data to generate a confidence score for the prediction, in accordance with various aspects and implementations of the subject disclosure.

One or more example aspects, such as corresponding to operations of a method, are represented in FIG. 9. Operation 902 represents obtaining, at a system comprising a processor, a dataset comprising parameter data of a storage device. Operation 904 represents inputting the dataset into a machine learning classifier that outputs prediction data representing a survival rate of the storage device to survive to a specified future time point. Operation 906 represents generating, via a conformal prediction framework, a confidence score representing a quality estimate of the prediction data. Operation 908 represents associating the confidence score with an identifier of the storage device. Operation 910 represents ranking the storage device relative to respective other storage devices based on the confidence score associated with the storage device relative to respective confidence scores associated with the respective other storage devices.

Inputting the dataset into the machine learning classifier can comprise inputting the dataset into an online semi-parametric Mondrian survival forest classifier that produces a forest of decision trees and determines the prediction data based on data associated with individual trees of the forest.

Aspects can comprise generating, via the conformal prediction framework, a credibility score, and using the credibility score to determine whether the confidence score is credible according to a credibility criterion.

Figure 10:
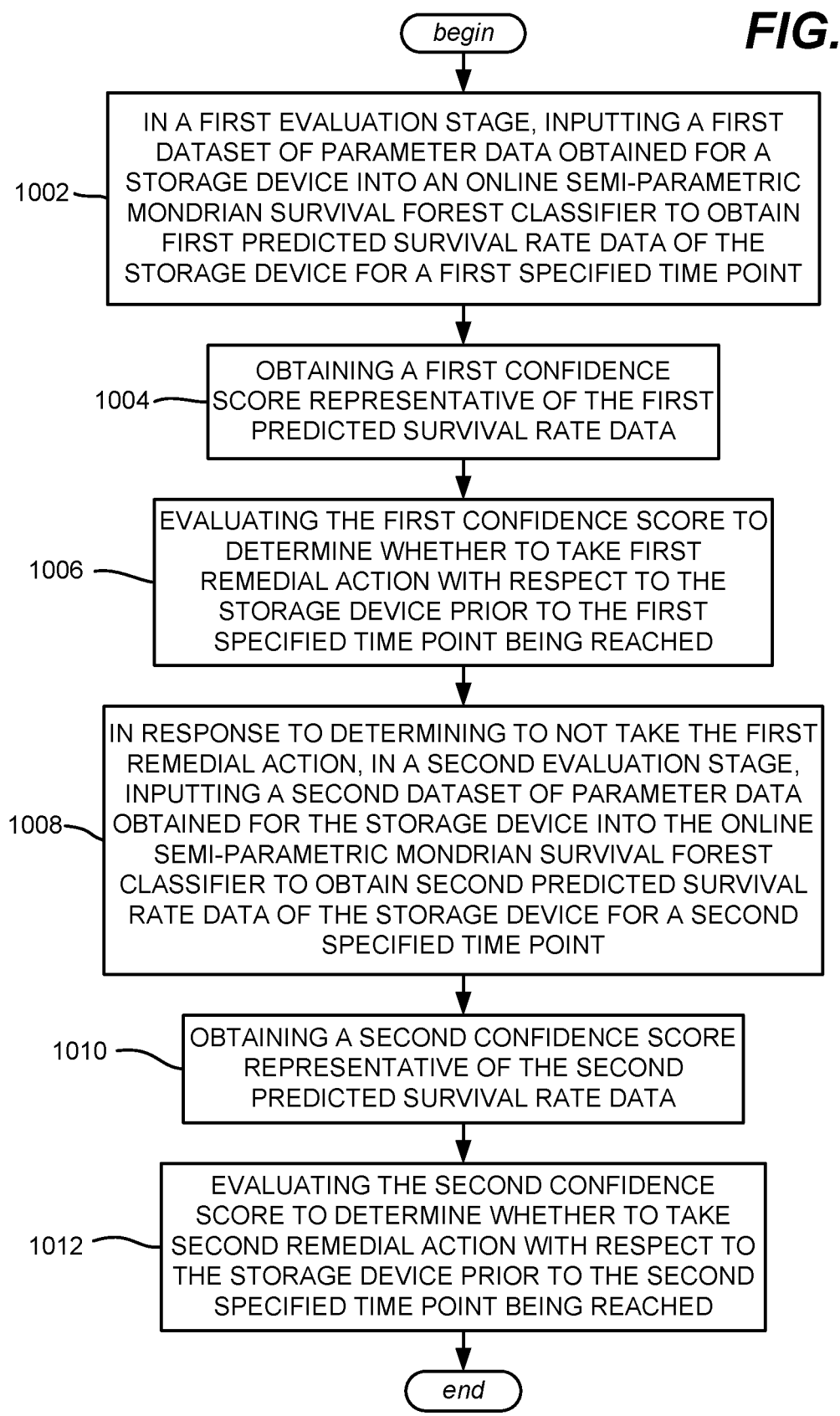
FIG. 10 is an example flow diagram showing example operations related to evaluating the confidence of the predicted survival of a storage device to a next time point at multiple stages, to determine whether to take remedial action, in accordance with various aspects and implementations of the subject disclosure.

FIG. 10 summarizes various example operations, e.g., corresponding to a machine-readable storage medium, comprising executable instructions that, when executed by a processor, facilitate performance of operations. Operation 1002 represents in a first evaluation stage, inputting a first dataset of parameter data obtained for a storage device into an online semi-parametric Mondrian survival forest classifier to obtain first predicted survival rate data of the storage device for a first specified time point. Operation 1004 represents obtaining a first confidence score representative of the first predicted survival rate data. Operation 1006 represents evaluating the first confidence score to determine whether to take first remedial action with respect to the storage device prior to the first specified time point being reached. Operation 1008 represents in response to determining to not take the first remedial action, in a second evaluation stage, inputting a second dataset of parameter data obtained for the storage device into the online semi-parametric Mondrian survival forest classifier to obtain second predicted survival rate data of the storage device for a second specified time point. Operation 1010 represents obtaining a second confidence score representative of the second predicted survival rate data. Operation 1012 represents evaluating the second confidence score to determine whether to take second remedial action with respect to the storage device prior to the second specified time point being reached.

further operations can comprise, in response to determining not to take the second remedial action, in a third evaluation stage, inputting a third dataset of parameter data obtained for the storage device into the online semi-parametric Mondrian survival forest classifier to obtain third predicted survival rate data of the storage device for a third specified time point, obtaining a third confidence score representative of the third predicted survival rate data, and evaluating the third confidence score to determine whether or not to take third remedial action with respect to the storage device prior to the third specified time point being reached.

Further operations can comprise ranking the storage device relative to respective other storage devices based on the first confidence score associated with the storage device relative to respective confidence scores associated with the respective other storage devices.

Further operations can comprise receiving an alert corresponding to an unhealthy state of the storage device; the first evaluation stage can correspond to the receiving the alert.

As can be seen, described is a technology for providing a reliable estimate of survival of a storage device, including to a specified time point, along with complementary metrics for prediction confidence. The output can include a credibility score. One implementation of the technology that uses a conformal prediction framework with an online semi-parametric Mondrian survival forest for predicting the survival rate of the component until a specified timeframe. Unlike failure prediction models that provide binary result (drive will fail or not), the model described herein is based on a conformal measure, which can output a confidence score (as shown in the example of FIG. 7). The model can simultaneously learn, predict, and improve the reliability of the prediction while making new predictions and validating the accuracy of the prediction.

Figure 11:
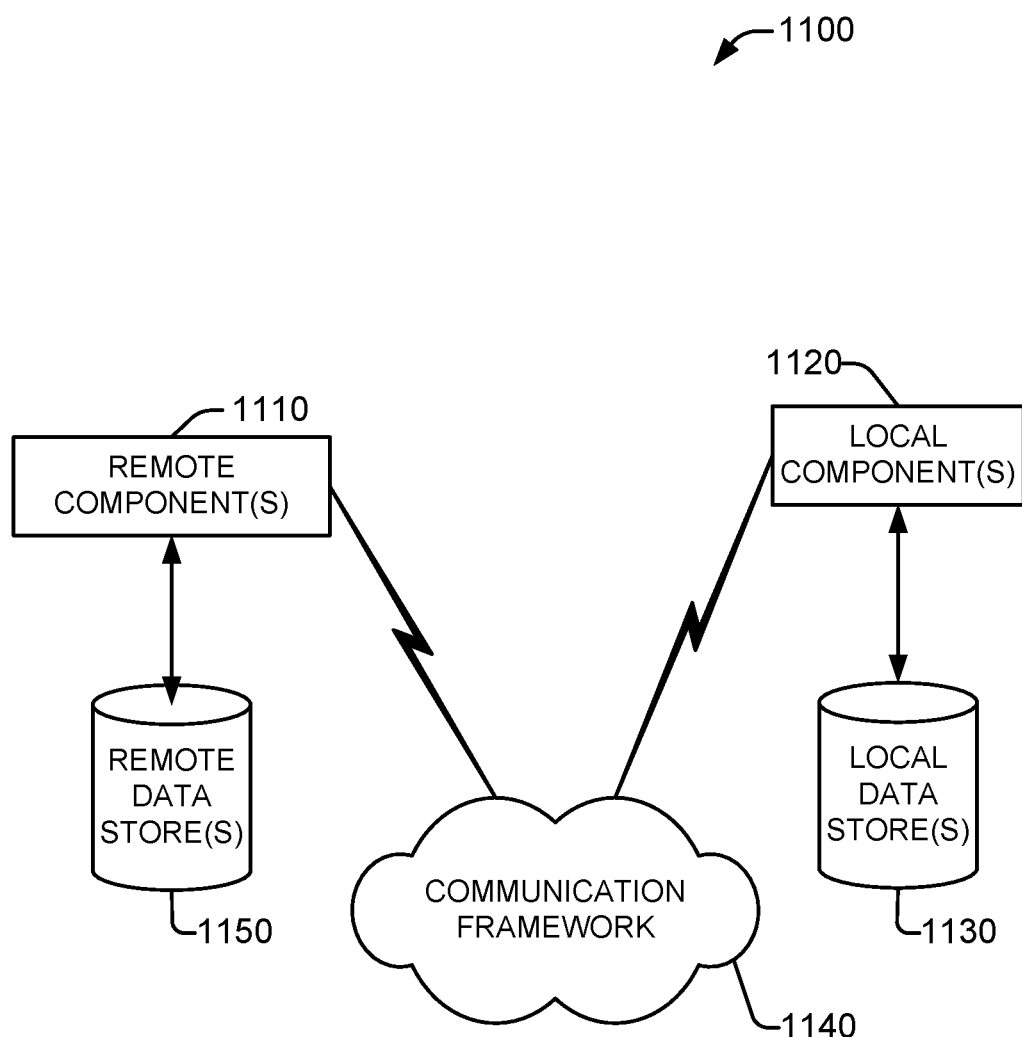
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
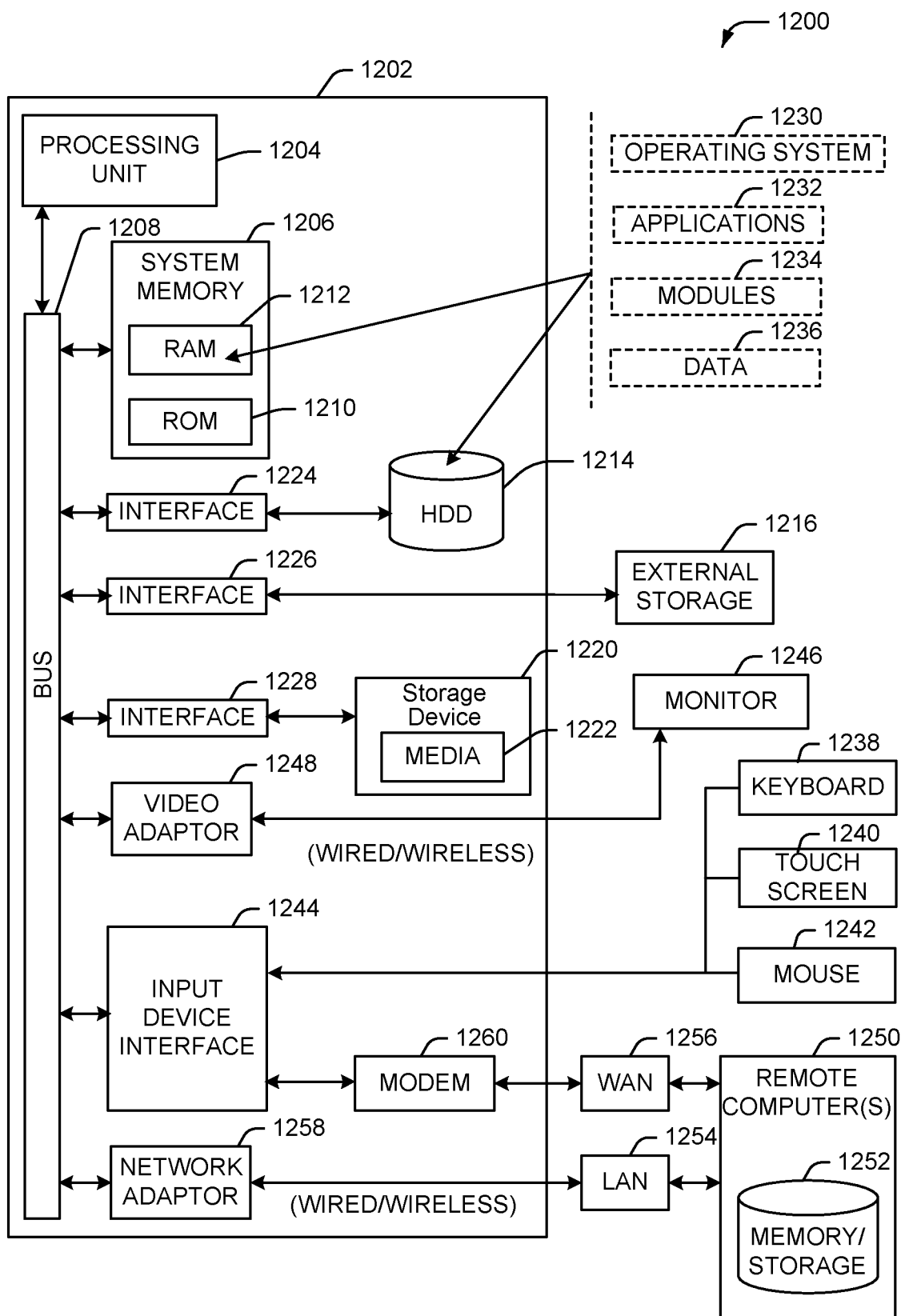
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE-1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
    selecting a storage device;
    obtaining a confidence score corresponding to a predicted survival rate of the storage device for a specified time point, comprising inputting a dataset of parameter data obtained for the storage device into a machine learning model that outputs predicted survival rate data relative to the specified time point, and inputting the predicted survival rate data into a prediction uncertainty quantifier that outputs the confidence score; and
    evaluating the confidence score to determine whether to take a remedial action with respect to the storage device prior to the specified time point being reached, wherein the evaluating comprises:
        ranking the storage device relative to respective other storage devices based on the confidence score associated with the predicted survival rate of the storage device relative to respective other confidence scores associated with respective other predicted survival rates of the respective other storage devices.

2. The system of claim 1, wherein the machine learning model comprises a semi-parametric Mondrian survival forest model.

3. The system of claim 2, wherein the storage device comprises a hard disk drive, and wherein the operations further comprise training the semi-parametric Mondrian survival forest model based on incremental learning using a training dataset obtained from a group of hard disk drives; or wherein the storage device comprises a solid state drive, and wherein the operations further comprise training the semi-parametric Mondrian survival forest model based on incremental learning using a training dataset obtained from a group of solid state drives.

4. The system of claim 1, wherein the prediction uncertainty quantifier comprises a conformal prediction framework that obtains a non-conformity measure to determine the confidence score and a credibility score.

5. The system of claim 1, wherein the prediction uncertainty quantifier comprises a Venn predictor.

6. The system of claim 1, wherein the machine learning model comprises a semi-parametric Mondrian survival forest model, and wherein the prediction uncertainty quantifier comprises a conformal prediction framework that obtains a non-conformity measure corresponding to the confidence score.

7. The system of claim 1, wherein the machine learning model comprises a k-nearest neighbor classifier, a random forest classifier, a support vector machines classifier, a neural networks classifier, a logistic regression classifier, or a boosting classifier.

8. The system of claim 1, wherein the operations further comprise receiving an alert based on simple network management protocol (SNMP) data received from the storage device, and wherein the selecting the storage device is based on the receiving the alert.

9. The system of claim 1, wherein the specified time point is a first time point associated with a first evaluation stage, wherein the confidence score is a first confidence score, wherein the predicted survival rate is a first predicted survival rate, wherein the dataset of parameter data is a first dataset of parameter data, wherein the predicted survival rate data is a first predicted survival rate data, wherein the remedial action is a first remedial action, and wherein the operations further comprise:
    in response to determining not to take the first remedial action with respect to the storage device, in a second evaluation stage, obtaining a second confidence score corresponding to a second predicted survival rate of the storage device for a second specified time point, comprising inputting a second dataset of parameter data obtained for the storage device into the machine learning model that outputs second predicted survival rate data relative to the second specified time point, and inputting the second predicted survival rate data into the prediction uncertainty quantifier that outputs the second confidence score, and evaluating the second confidence score to determine whether to take a second remedial action with respect to the storage device prior to the second specified time point being reached.

10. The system of claim 9, wherein the operations further comprise passing the first confidence score to the second evaluation stage as a prior confidence score, and wherein evaluating the second confidence score to determine whether to take the second remedial action comprises determining whether the second confidence score relative to the prior confidence score indicates storage device degradation to a specified level.

11. The system of claim 1, wherein the storage device is a hard disk drive, and wherein the dataset of parameter data comprises at least one of self-monitoring, analysis and reporting technology (SMART) variables, small computer system interface (SCSI) variables, or serial advanced technology attachment (SATA) variables collected with respect to the hard disk drive.

12. The system of claim 1, wherein the storage device is a solid state drive, and wherein the dataset of parameter data comprises at least one of self-monitoring, analysis and reporting technology (SMART) variables, small computer system interface (SCSI) variables, or serial advanced technology attachment (SATA) variables collected with respect to the solid state drive.

13. A method comprising,
obtaining, at a system comprising a processor, a dataset comprising parameter data of a storage device;
inputting the dataset into a machine learning classifier that outputs prediction data representing a survival rate of the storage device to survive to a specified future time point;
generating, via a conformal prediction framework, a confidence score representing a quality estimate of the prediction data;
associating the confidence score with an identifier of the storage device;
ranking the storage device relative to respective other storage devices based on the confidence score associated with the storage device relative to respective confidence scores associated with the respective other storage devices; and
evaluating the confidence score to determine whether to take a remedial action with respect to the storage device prior to the specified future time point being reached.

14. The method of claim 13, wherein the inputting the dataset into the machine learning classifier comprises inputting the dataset into an online semi-parametric Mondrian survival forest classifier that produces a forest of decision trees and determines the prediction data based on data associated with individual trees of the forest.

15. The method of claim 13, further comprising generating, via the conformal prediction framework, a credibility score, and using the credibility score to determine whether the confidence score is credible according to a credibility criterion.

16. The method of claim 13, wherein the storage device comprises at least one of a hard disk drive or a solid state drive.

17. A non-transitory machine-readable storage medium, comprising executable instructions that, when executed by a processor, facilitate performance of operations, the operations comprising:
in a first evaluation stage, inputting a first dataset of parameter data obtained for a storage device into an online semi-parametric Mondrian survival forest classifier to obtain first predicted survival rate data of the storage device for a first specified time point;
obtaining a first confidence score representative of the first predicted survival rate data;
evaluating the first confidence score to determine whether to take first remedial action with respect to the storage device prior to the first specified time point being reached; and
in response to determining to not take the first remedial action, in a second evaluation stage, inputting a second dataset of parameter data obtained for the storage device into the online semi-parametric Mondrian survival forest classifier to obtain second predicted survival rate data of the storage device for a second specified time point;
obtaining a second confidence score representative of the second predicted survival rate data; and
evaluating the second confidence score to determine whether to take second remedial action with respect to the storage device prior to the second specified time point being reached.

18. The non-transitory machine-readable storage medium of claim 17, wherein the operations further comprise, in response to determining not to take the second remedial action, in a third evaluation stage, inputting a third dataset of parameter data obtained for the storage device into the online semi-parametric Mondrian survival forest classifier to obtain third predicted survival rate data of the storage device for a third specified time point, obtaining a third confidence score representative of the third predicted survival rate data, and evaluating the third confidence score to determine whether or not to take third remedial action with respect to the storage device prior to the third specified time point being reached.

19. The non-transitory machine-readable storage medium of claim 17, wherein the operations further comprise ranking the storage device relative to respective other storage devices based on the first confidence score associated with the storage device relative to respective confidence scores associated with the respective other storage devices.

20. The non-transitory machine-readable storage medium of claim 17, wherein the operations further comprise receiving an alert corresponding to an unhealthy state of the storage device, and wherein the first evaluation stage corresponds to the receiving the alert.

* * * * *